(12) United States Patent
Gupta et al.

(10) Patent No.: US 11,010,638 B2
(45) Date of Patent: May 18, 2021

(54) LOCAL BINARY PATTERN NETWORKS METHODS AND SYSTEMS

(71) Applicant: The Regents of the University of California, Oakland, CA (US)

(72) Inventors: Rajesh Gupta, La Jolla, CA (US); Jeng-Hau Lin, La Jolla, CA (US); Yunfan Yang, La Jolla, CA (US); Zeyu Chen, La Jolla, CA (US); Zhuowen Tu, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 186 days.

(21) Appl. No.: 16/268,440

(22) Filed: Feb. 5, 2019

(65) Prior Publication Data

US 2019/0244061 A1 Aug. 8, 2019

Related U.S. Application Data

(60) Provisional application No. 62/626,677, filed on Feb. 5, 2018.

(51) Int. Cl.
| | |
|---|---|
| *G06K 9/00* | (2006.01) |
| *G06K 9/62* | (2006.01) |
| *G06K 9/66* | (2006.01) |
| *G06K 9/32* | (2006.01) |

(52) U.S. Cl.
CPC ......... *G06K 9/6256* (2013.01); *G06K 9/3216* (2013.01); *G06K 9/6228* (2013.01); *G06K 9/6232* (2013.01); *G06K 9/66* (2013.01)

(58) Field of Classification Search
CPC .............. G06K 9/66; G06K 2009/4666; G06T 2207/20081
See application file for complete search history.

(56) References Cited

U.S. PATENT DOCUMENTS

| | | | |
|---|---|---|---|
| 2012/0189197 A1* | 7/2012 | Li | H04N 9/8205 382/165 |
| 2016/0253466 A1* | 9/2016 | Agaian | G06K 9/629 382/128 |

OTHER PUBLICATIONS

Nanni, Loris, Alessandra Lumini, and Sheryl Brahnam. "Survey on LBP based texture descriptors for image classification." Expert Systems with Applications 39.3 (2012): 3634-3641. (Year: 2012).*
(Continued)

*Primary Examiner* — Li Liu
(74) *Attorney, Agent, or Firm* — Perkins Coie LLP

(57) ABSTRACT

Disclosed are devices, systems and methods for providing efficient implementations for pattern recognition. Embodiments of the disclosed technology use local binary comparisons and random projection in place of conventional convolution operations. Some embodiments of the disclosed technology provide an important means to improve memory and speed efficiency that is particularly suited for small footprint devices and hardware accelerators. Other embodiments compare a binary pattern to one or more portions of an input image to determine a plurality of binary results, and generate an estimate of the feature based on the plurality of binary results. Yet other embodiments generate an final image, comprising a final estimate of the feature, by randomly selecting one or more portions from each of a plurality of initial images, wherein each of the plurality of initial images comprises an initial estimate of the feature.

20 Claims, 13 Drawing Sheets

(56) References Cited

OTHER PUBLICATIONS

Karis, Mohd Safirin, et al. "Local binary pattern (LBP) with application to variant object detection: A survey and method." 2016 IEEE 12th International Colloquium on Signal Processing & Its Applications (CSPA). IEEE, 2016. (Year: 2016).*

Liang, Shuang, et al. "FP-BNN: Binarized neural network on FPGA." Neurocomputing 275 (2018): 1072-1086. (Year: 2018).*

Bingham, E. et al., Random projection in dimensionality reduction: applications to image and text data, In ACM SIGKDD, 2001.

Courbariaux, M. et al., BinaryConnect: Training Deep Neural Networks with binary weights during propagations. Advances in Neural Information Processing Systems (NIPS), pp. 3123-3131, 2015.

Dai, J. et al., Deformable convolutional networks. In ICCV, 2017.

Girshick, R. et al., Rich Feature Hierarchies for Accurate Object Detection and Semantic Segmentation. In CVPR, 2014.

Guo, Y. et al., Dynamic network surgery for efficient dnns. In NIPS, 2016.

Han, S. et al., Deep compression: Compressing deep neural networks with pruning, trained quantization and huffman coding. In ICLR, 2015.

He, K. et al., Deep Residual Learning for Image Recognition. 2016.

Hinton, G.E. et al., A fast learning algorithm for deep belief nets. Neural computation, 18:1527-1554, 2006.

Horowitz, M., 1.1 Computing's energy problem (and what we can do about it). In Solid-State Circuits Conference Digest of Technical Papers (ISSCC), 2014 IEEE International, pp. 10-14. IEEE, 2014.

Hubara, I. et al., Binarized neural networks. In NIPS, pp. 4107-4115, 2016.

Iandola, F.N. et al., Squeezenet: Alexnet-level accuracy with 50x fewer parameters and, 0.5 mb model size. arXiv preprint arXiv:1602.07360, 2016.

Jeon, Y. et al., Active convolution: Learning the shape of convolution for image classification. In CVPR, 2017.

Juefei-Xu, F. et al., Local binary convolutional neural networks. In CVPR, 2017.

Krizhevsky, A. et al., Imagenet classification with deep convolutional neural networks. In NIPS, pp. 1097-1105, 2012.

Le Cun, Y. et al., Backpropagation applied to handwritten zip code recognition. Neural computation, 1(4):541-551, 1989.

Le Cun, Y. et al., Optimal brain damage. In NIPS, 1989.

Lin, J-H. et al., "Local Binary Pattern Networks".

Lin, J-H. et al., Binarized convolutional neural networks with separable filters for efficient hardware acceleration. Computer Vision and Pattern Recognition Workshop (CVPRW), 2017.

Liu, B. et al., Sparse convolutional neural networks. In CVPR, 2015.

Long, J. et al., Fully convolutional networks for semantic segmentation. CVPR, 2015.

Lowe, D.G. et al., Distinctive image features from scale—invariant keypoints. International journal of computer vision, 60(2):91-110, 2004.

Ojala, T. et al., A comparative study of texture measures with classification based on featured distributions. Pattern recognition, 29(1):51-59, 1996.

Rastegari, M. et al., XNOR-Net: ImageNet Classification Using Binary Convo-lutional Neural Networks. In ECCV, 2016.

Simonyan, K. et al., Very deep convolutional networks for large-scale image recognition. In ICLR, 2015.

Szegedy, C. et al., Going deeper with convolutions. In CVPR, 2015.

Wang, X. et al., An hog-lbp human detector with partial occlusion handling. In CVPR, 2009.

* cited by examiner

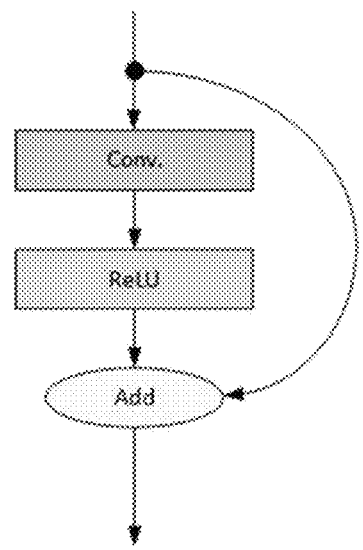 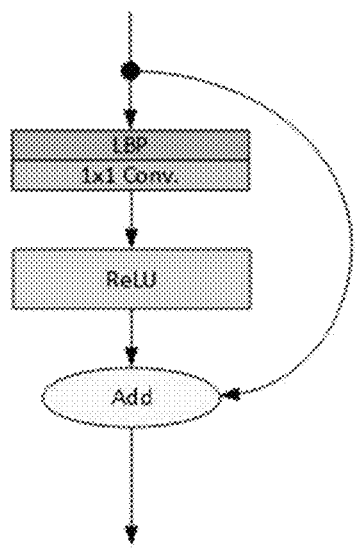 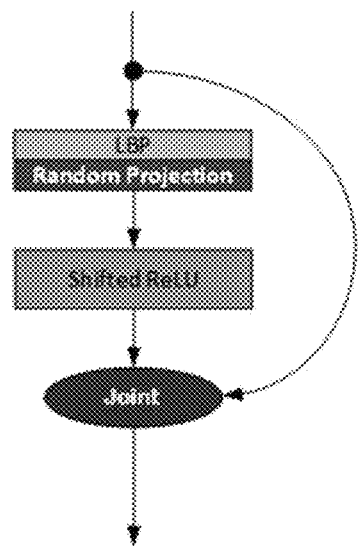
FIG. 5A    FIG. 5B    FIG. 5C
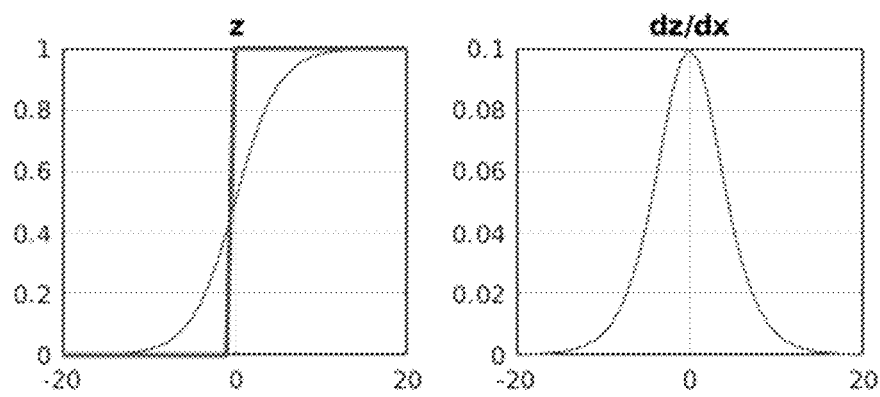
FIG. 6

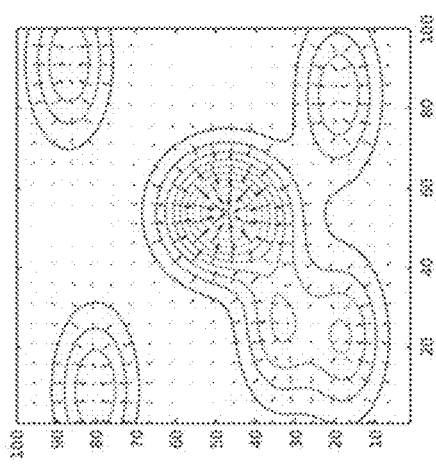
FIG. 7A
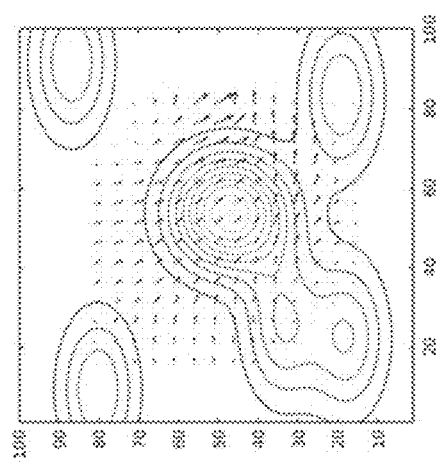
FIG. 7B
FIG. 7C
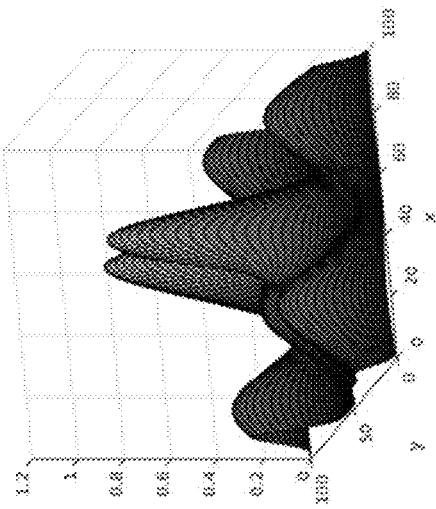
FIG. 7D

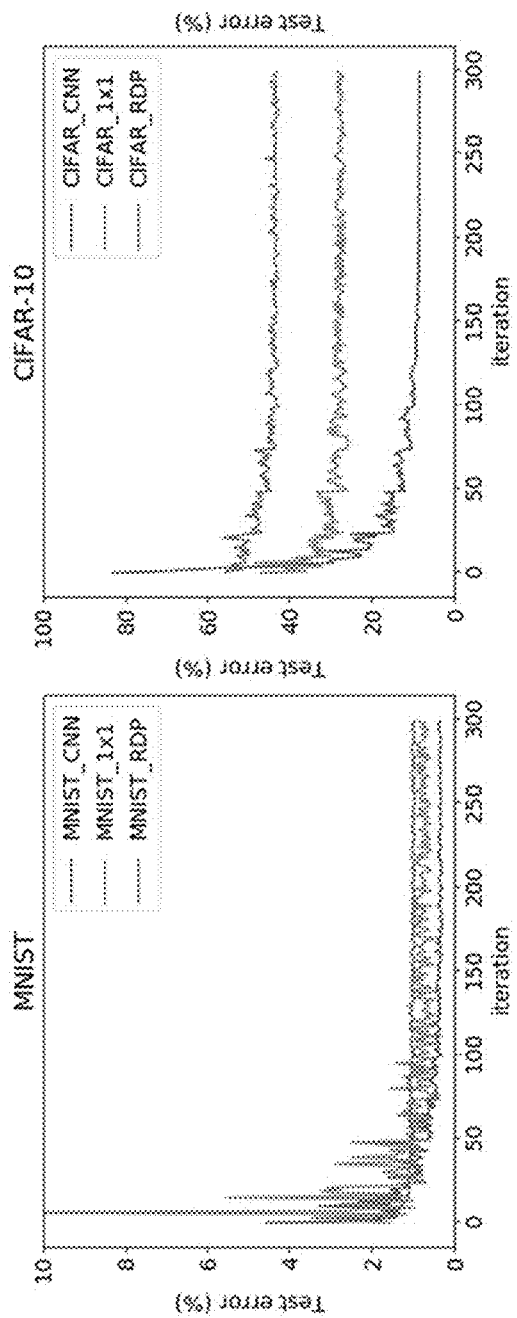
FIG. 9A
FIG. 9B
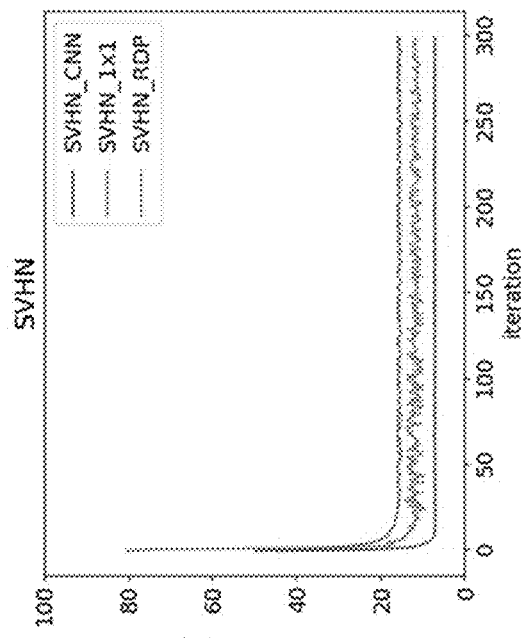
FIG. 9C

Algorithm 1: Forward of LBPNet input : An input tensor $X$ of shape $(c_i, w, h)$, previous pattern $P$ of shape $(c_o, n_s)$, and the fixed projection map $M$ of shape $(c_o, n_s)$. The pattern width $k$ and padding width $d = \lfloor \frac{k}{2} \rfloor$. Please note every element of $P$ is a tuple.

output: A scalar predictions $y$.

1   $X \leftarrow \text{ZeroPadding}(X, d)$;
2   for $i_o = 1$ *to* $c_o$ do
3     for $i_h = 1$ *to* $h$ do
4       for $i_w = 1$ *to* $w$ do
5         for $i_s = 1$ *to* $n_s$ do
6           $i_c \leftarrow M[i_o, i_s]$;
7           $(i_{px}, i_{py}) \leftarrow P[i_o, i_s]$;
8           pivot $\leftarrow X[i_c][i_w + d][i_w + d][i_h]$;
9           sample $\leftarrow X[i_c][i_w + i_{px}][i_w + i_{py}][i_h]$;
10          if *sample > pivot* then
11             $y[i_w][i_h][i_o] \mathrel{|}= 1 \ll i_s$
12          end
13        end
14      end
15    end
16   end
17   return $y$

FIG. 12

Algorithm 2: Backward of LBPNet input : An input tensor $X$, a gradient tensor of loss w.r.t the output of current layer $g_O(c_o \times w_o \times h_o)$, previous pattern $P$, and the fixed projection map $M$. The pattern width $h$ and padding width $d$. During training, we remember the previous real-valued pattern $R$ of the same shape of $P$.

output: The gradient of loss w.r.t. the input tensor $g_I$ in shape $(c_i, w_i, h_i)$, and the gradient of loss w.r.t. the position of sampling point. $g_P$ in shape $(c_o, n_s)$. Please note every element of $g_P$ is a tuple.

1   $\nabla \leftarrow \text{ImageGradient}(X)$;
2   $\hat{P} \leftarrow \text{round}(P)$;
3   $D \leftarrow \text{LookUpDifference}(X, \hat{P}, M)$;
4   $E \leftarrow \text{ConstructExp}(\tanh(D), \hat{P}, M)$;
5   $dE \leftarrow \text{ConstructDiffExp}(1 - \tanh^2(D), \hat{P}, M)$;
6   $g_a \leftarrow \frac{1}{2} g_O^T E$;
7   $g_P \leftarrow g_a (dE \star \nabla)^T$;
8   return $g_I, g_P, R, \hat{P}$

FIG. 13

LOCAL BINARY PATTERN NETWORKS METHODS AND SYSTEMS

CROSS-REFERENCE TO RELATED APPLICATION(S)

This patent document claims priority to and benefits of U.S. Provisional Patent Application No. 62/626,677 entitled "LOCAL BINARY PATTERN NETWORKS" and filed on Feb. 5, 2018. The entire contents of the before-mentioned patent application is incorporated by reference as part of the disclosure of this patent document.

TECHNICAL FIELD

This patent document is directed generally to machine learning, and specifically to efficient hardware implementations for machine learning.

BACKGROUND

Convolutional neural networks (CNN) have created a notable impact on machine learning and computer vision. Modern CNN architectures such as AlexNet, VGG, GoogLetNet, and ResNet have greatly propelled the use of deep learning techniques into a wide range of computer vision applications. These gains have benefited from continuing advances in computing and storage capabilities of modern computing machines.

SUMMARY

Disclosed are devices, systems and methods for providing efficient implementations for pattern recognition. This may be achieved by using local binary comparisons and random projection in place of conventional convolution (or approximation of convolution) operations. Embodiments of the disclosed technology can be implemented efficiently on different platforms including direct hardware implementation.

In one aspect, the disclosed technology may be used to provide a method for providing efficient implementations for pattern recognition. This method includes determining, based on a comparison between pixels of the input image and a kernel, an intermediate output that includes an initial estimate of the at least one feature of the input image, and determining, based on selecting one or more values from the intermediate output in a predetermined manner, a final output image that includes a refined estimate of the at least one feature of the input image, wherein the comparison comprises comparing a value of a pixel of the input image that aligns with a center sample of the kernel to one or more values of one or more pixels of the input image that align with predetermined samples of the kernel that are adjacent to the center sample.

In another aspect, the above-described method(s) are embodied in the form of processor-executable code and stored in a computer-readable program medium.

In yet another exemplary aspect, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 5A-5C show exemplary building blocks for the LBPNet.

FIG. 6 shows an exemplary approximation for the comparison operator used in the backward propagation step of an LBPNet.

FIGS. 7A-7D show an example of optical flow theory used in the backward propagation step of an LBPNet.

FIGS. 9A-9C shows examples of leanings curves of LBPNets on different datasets.

FIG. 12 shows an example of the forward propagation algorithm for the LBPNet.

FIG. 13 shows an example of the backward propagation algorithm for the LBPNet.

DETAILED DESCRIPTION

Figure 1:
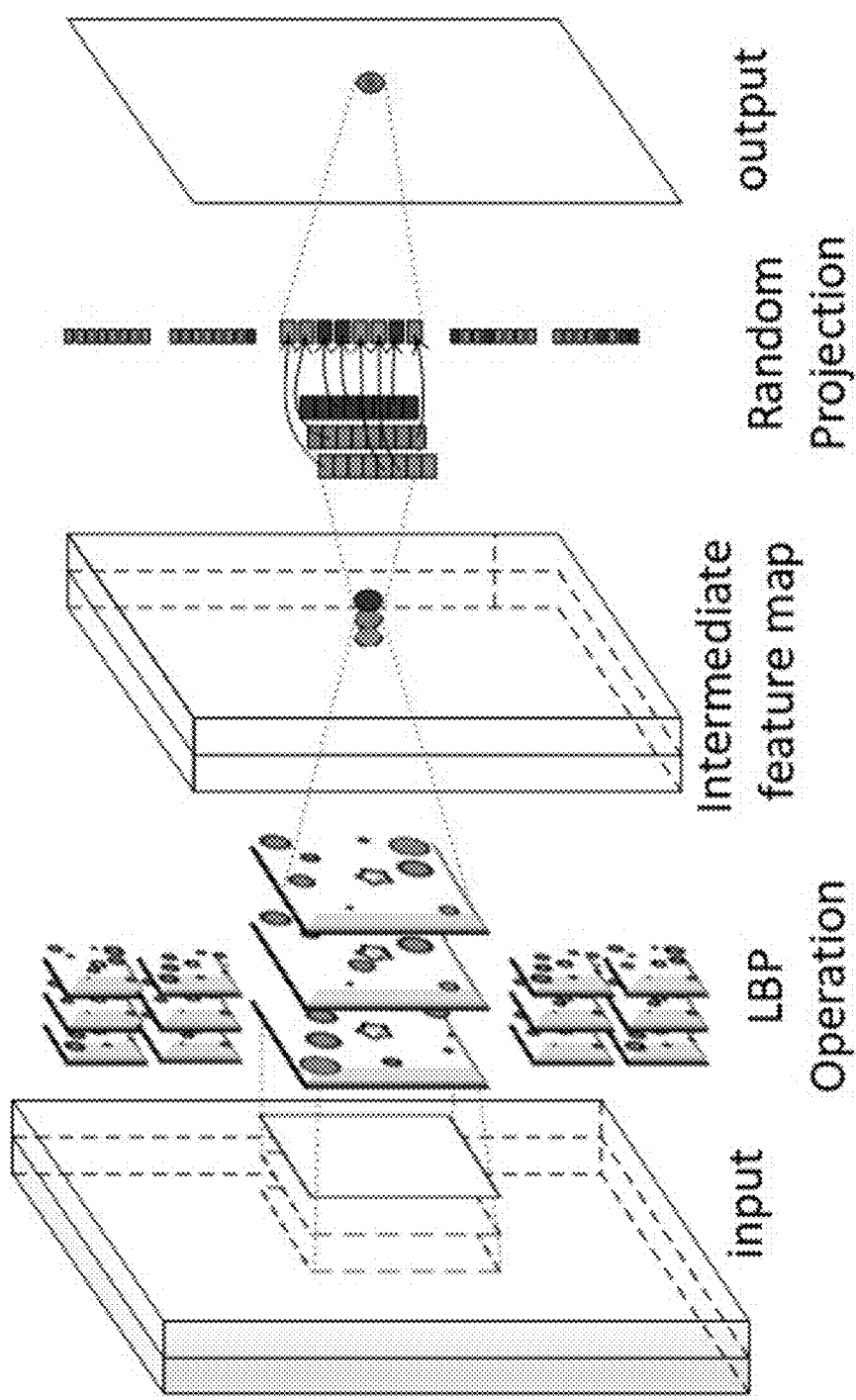
FIG. 1 shows a block diagram an exemplary local binary pattern network (LBPNet).

Memory and computation efficient deep learning architectures are an active area of research in machine learning and computer architecture. Model size reduction and efficiency gains have been reported by selectively using binarization of operations in convolutional neural networks that approximate convolution by reducing floating point arithmetic operations. Some embodiments of the disclosed technology comprise local binary pattern networks or LBPNets, that are able to learn and perform binary operations in an end-to-end fashion. LBPNet uses local binary comparisons and random projection in place of conventional convolution (or approximation of convolution) operations. These operations can be implemented efficiently on different platforms including direct hardware implementation. Some embodiments of the disclosed technology provide an important means to improve memory and speed efficiency that is particularly suited for small footprint devices and hardware accelerators.

As CNN-family models mature and take on increasingly complex pattern recognition tasks, the commensurate increase in the use of computational resources further limits their use to compute-heavy CPU and GPU platforms with sophisticated (and expensive) memory systems. On the other hand, the emerging universe of embedded devices especially when used as edge-devices in distributed networks presents a much greater range of potential applications where such capabilities can be deployed to enable new system-level services that use sophisticated in-situ learning and analysis tasks. To achieve this vision, however, deep learning networks need to be significantly more memory and compute efficient, both in their model size as well as working set size.

Table 1 lists recognition accuracy, number of parameters, model size, and floating point operations (FLOP), for three well-known architectures. While there have been improvements, these model sizes and computational needs demand use of desktop- or server-class machines in real-life applications.

TABLE 1

Model size and computational needs for three models for ImageNet classification

|  | AlexNet | VGG16 | GoogLeNet |
| --- | --- | --- | --- |
| Accuracy | 84.7% | 92.38% | 93.33% |
| Parameters | 61 million | 138 million | 6.8 million |
| Memory | 233 MB | 526 MB | 26 MB |
| FLOP | 1.5 billion | 3 billion | 1.5 billion |

Previous systems have performed network pruning, compression, or sparsification. Impressive results have been achieved lately by using binarization of selected operations in CNNs. These efforts seek to approximate the internal computations from floating point to binary while keeping the underlying convolution operation exact or approximate.

Embodiments of the disclosed technology include using non-convolutional operations that can be executed in an architecture/hardware-friendly manner. The local binary pattern (LBP) uses a number of predefined sampling points, that are mostly on the perimeter of a circle, to compare with the pixel value at the center. The combination of multiple logic outputs ("1" if the value on a sampling point is greater than that on the center point and "0" otherwise) give rise to a surprising rich representation about the underlying image patterns and has shown to be complementary to the SIFT-kind features.

Section headings are used in the present document to improve readability of the description and do not in any way limit the discussion or the embodiments (and/or implementations) to the respective sections only.

1. Examples of Related Work

Binarization for CNN.

Binarizing CNNs to reduce the model size has been an active research direction. One system has focused on building binary connections between the neurons. Binarized neural networks (BNNs) successfully broke the curse of dimensionality as it relates to precision in hardware through binarizing both weights and activations. The model size was reduced, and the multiplication was replaced by logic operations, although non-binary operations like batch normalization with scaling and shifting were still implemented. As a result, the BNN is not totally bit-wise but it intelligently moves the inter-neuron traffic to intra-neuron computation. Yet another system (XNOR-Net) introduces an extra scaling layer to compensate the loss of binarization, and achieves a state-of-the-art accuracy on ImageNet. Both BNNs and XNORs can be considered as the discretization of real-numbered CNNs, while the core of the two works are still based on spatial convolution.

CNN Approximation for LBP Operation.

Local binary convolutional neural networks (LBCNNs) utilize subtraction between pixel strengths together with a ReLU layer to simulate the LBP operations. The convolution between the sparse binary filters and images is actually a difference filtering, thus making LBCNN work like an edge detector. During the training, the sparse binarized difference filters are fixed, only the successive 1-by-1 convolution serving as channel fusion mechanism and the parameters in batch normalization layers are learned. By contrast, embodiments of the disclosed technology learn binary patterns and logic operations from scratch, resulting in orders of magnitude reduction in memory size and testing speed up than LBCNN.

Active or Deformable Convolution.

Yet other systems that learn local patterns are active convolution and deformable convolution, where data dependent convolution kernels are learned. Both of these systems are quite different from embodiments of the disclosed technology since they do not seek to improve the network efficiency. Some embodiments learn the position of the sampling points in an end-to-end fashion as logic operations that do not have the addition operations whereas the deformable convolution system essentially learns data-dependent convolutions.

2. Exemplary Embodiments of Local Binary Pattern Networks (LBPNets)

An overview of the LBPNet is shown in FIG. 1. As shown in FIG. 1, the forward propagation is composed of two steps: LBP operation (comparison and bit-allocation) and channel fusion (performed using random projection).

2.1 Forward Propagation in LBPNets

Patterns in LBPNets.

Figure 2A:
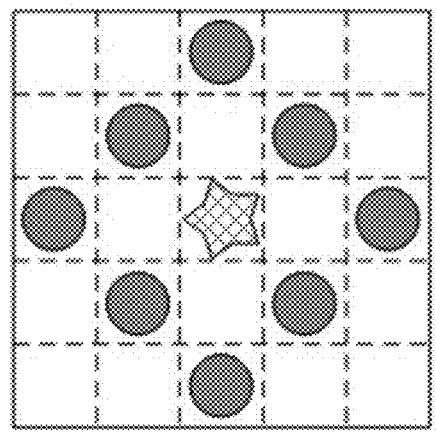
FIGS. 2A-2D shows an example of a local binary pattern during the training process.
Figure 2B:
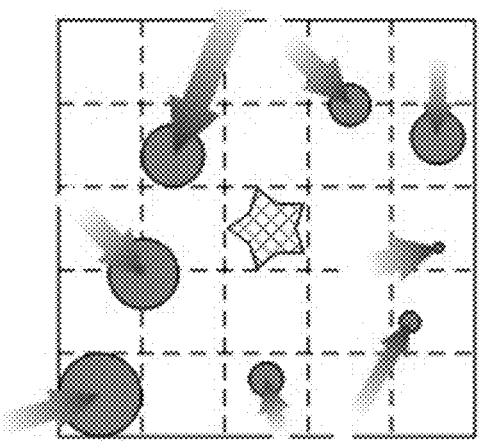
Figure 2C:
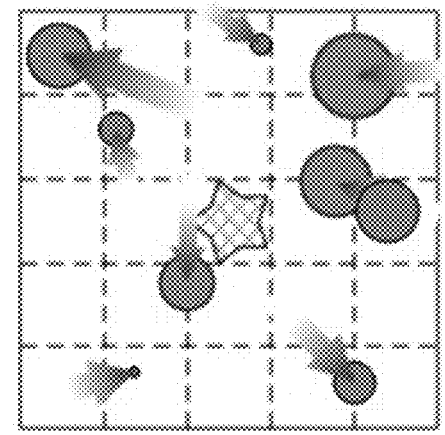
Figure 2D:
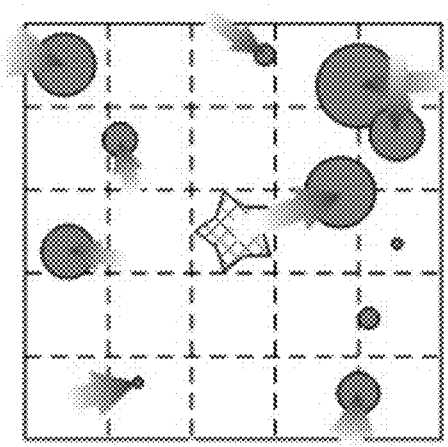

In some embodiments of LBPNet, there are multiple patterns defining the positions of sampling points to generate multiple output channels. Patterns are randomly initialized with a normal distribution of locations on a predefined square area. FIG. 2A shows a traditional local binary pattern, there are eight sampling points denoted by green circles, surrounding a pivot point in the meshed star at the center of pattern. FIGS. 2B through 2D show a learnable pattern with eight sampling points in green, and a center pivot point as a star at the center.

Different sizes of the green circle stand for the bit position of the true-false outcome on the output magnitude. The comparison outcome of the largest green circle is allocated to the most significant bit of the output pixel, the second largest to the 2nd bit, and so on. The red arrows represents the driving forces that can push the sampling points to better positions to minimize the classification error.

LBP Operation.

In some embodiments, LBPNet samples pixels from incoming images and compares the sampled pixel strength with the center sampled point, the pivot. If the sampled pixel strength is larger than the center sampled strength, the output is a bit "1"; otherwise, the output is set to "0." Next, the output bits are allocated to a number's different binary digits based on a predefined ordering. The number of sampling points defines the number of bits of an output pixel on a feature map. Then the local binary pattern is slid to the next location and the aforementioned steps are performed until a feature map is generated. In most cases, the incoming image has multiple channels, hence the aforementioned comparisons are performed on every input channel.

Figure 3:
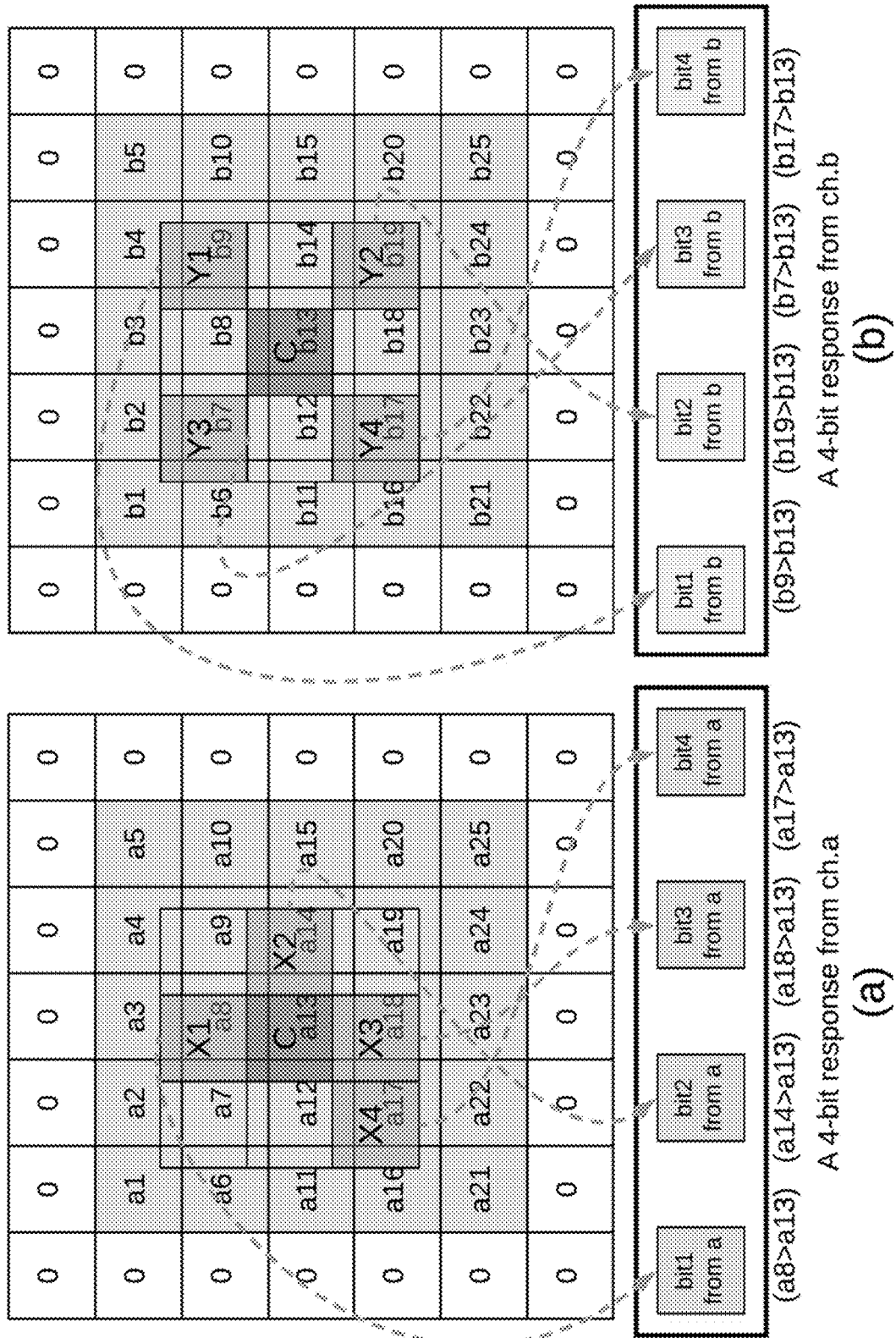
FIG. 3 shows an example of a LBP operation on multiple input channels.

FIG. 3 shows a snapshot of the LBP operation. Given two input channels, ch.a and ch.b, the LBP operation is performed on each channel with different kernel patterns. In an example, each local binary pattern has 4 sampling points confined within 3-by-3 areas. The two binary numbers of the intermediate output are shown on the right hand side of FIG. 3. For clarity, green dashed arrows are used to mark where the pixel are sampled, and the comparison equations are listed under each bit. In some embodiments, a channel fusion mechanism may be needed to avoid the explosion of the channels.

Channel Fusion with Random Projection.

Figure 4:
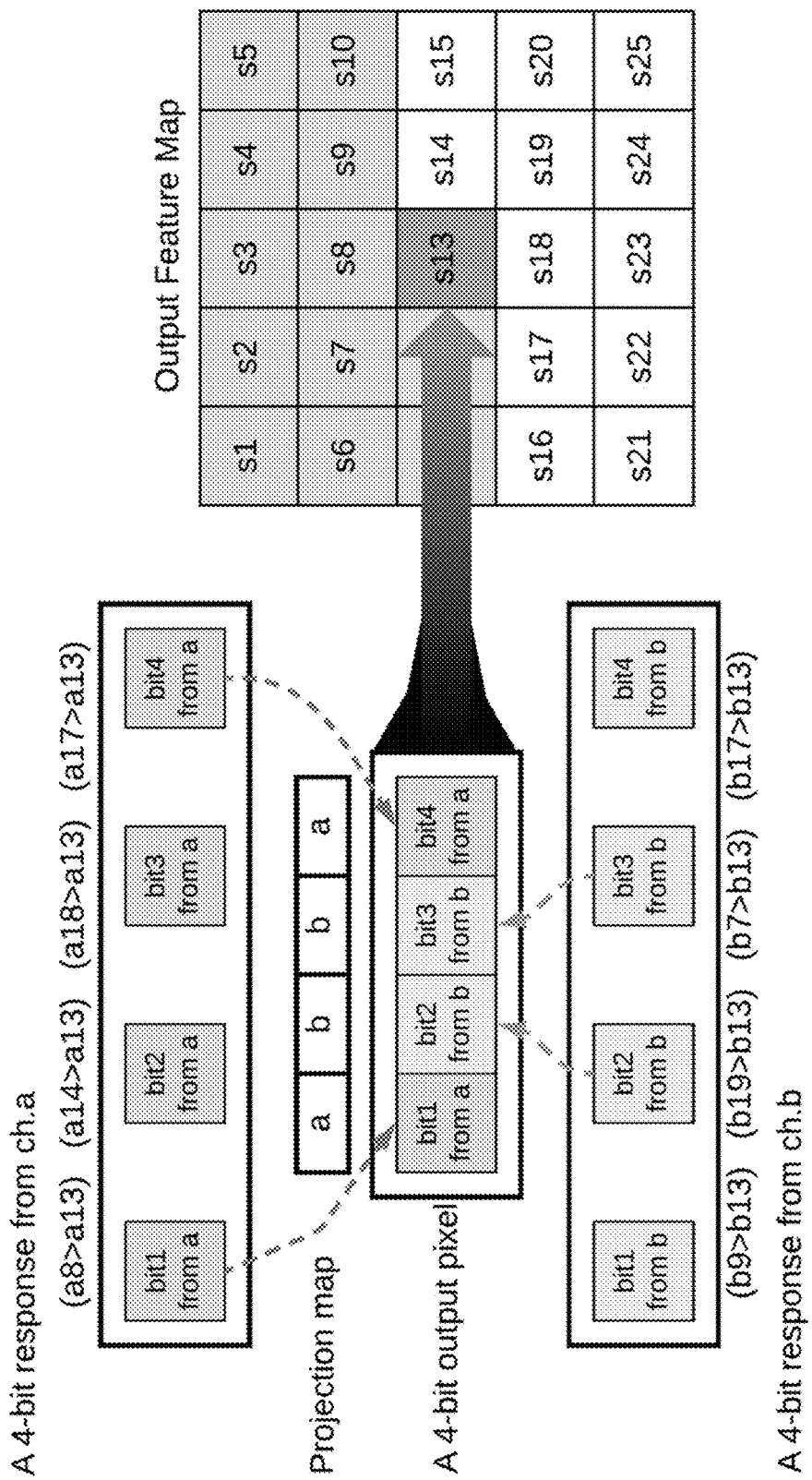
FIG. 4 shows an example of LBP channel fusing.

In some embodiments, random projection is used as a dimension-reducing and distance-preserving process to select output bits among intermediate channels for the concerned output channel as shown in FIG. 4. The random projection is implemented with a predefined mapping table for each output channel. The projection map is fixed upon initialization. All output pixels on the same output channel share the same mapping. Random projection not only solves the channel fusion with a bit-wise operation, but also simplifies the computation, because all sampling points do not have to be compared with the pivots.

For example, in FIG. 4, the two pink arrows from intermediate ch.a, and the two yellow arrows from intermediate ch.b bring the four bits for the composition of an output pixel. In other words, only the MSB and LSB on ch.a and the middle two bits on ch.b need to be computed. If the output pixel is n-bit, for each output pixel, there will be n comparisons needed, which is irrelevant with the number of input channels. The more input channels simply bring the more combinations of channels in a random projection table.

Throughout the forward propagation, there is no resource demanding multiplication or addition. Only comparison and memory access are used. Therefore, the design of LBPNets is efficient in the aspects of both software and hardware.

Embodiments of the disclosed technology use random projection for channel fusion to advantageously reduce the computational complexity. Referring back to FIG. 1, the input image includes three channels (denoted $N_{in}$) and there are five LBP kernels (denoted $N_k$). As shown in the example of FIG. 1, each kernel generates three intermediate channels, thereby resulting in fifteen intermediate channels (or outputs, and more generally $N_{in} \times N_k$ intermediate outputs), and random projection is used to fuse three intermediate channels, finally resulting in five output channels (denoted as $N_{out} = N_k$ in this example). Without channel fusion, the number of output channels grows increasing large especially when multiple LBP layers are stacked up.

Network Structures for LBPNets.

In some embodiments, and owing to the nature of comparison, the outcome of a LBP layer is very similar with the outlines in the input image. In other words, the LBP layer is good at extracting high frequency components in the spatial domain, but is not explicitly designed to understand low frequency components, and therefore, a residual-like structure is employed.

FIGS. 5A-5C show three kinds of residual-net-like building blocks. FIG. 5A is the typical building block for residual networks. The convolutional kernels learn to obtain the residual of the output after the addition. Introducing the LBP layer into this block, as shown in FIG. 5B, utilizes a 1-by-1 convolution to learn a better combination of LBP feature maps. However, the convolution incurs too many MAC operations especially when the LBP kernels increases. In an alternative, the LBP operation is combined with a random projection as shown in FIG. 5C.

Since the pixels in the LBP output feature maps are always positive, a shifted rectified linear layer (shifted-ReLU) is used to increase nonlinearities. The shifted-ReLU truncates any magnitudes below the half the maximum of the LBP output. More specifically, if a pattern has n sampling points, the shifted-ReLU is defined as $$f(x) = \begin{cases} x, & x > 2^{n-1} - 1 \\ 2^{n-1} - 1, & \text{otherwise} \end{cases}$$

As described in this document, low-frequency components may be lost when information is passed through several LBP layers. In order to implement an LBP layer with no multiply-accumulate (MAC) operations, a joint operation is used to cascade the input tensor of the block and the output tensor of the shifted-ReLU along the channel dimension. Although the joining of tensors brings back the risk of channel explosion, the number of channels may be controlled if the number of LBP kernels are carefully designed.

Hardware Design.

LBPNets save in hardware cost by avoiding MAC operations. Table 2 lists the reference numbers of logic gates of the concerned arithmetic units. A ripple-carry full-adder requires 5 gates for each bit. A 32-bit multiplier includes a data-path logic and a control logic. Because there are too many feasible implementations of the control logic circuits, an open range is conservatively used to express the sense of the hardware expense. The comparison can be made with pure combinational logic circuit of 11 gates, which also means only the infinitesimal internal gate delays dominate the computation latency. Comparison is not only cheap in terms of its gate count but also fast due to lack of sequential logic inside. Slight difference on numbers of logic gates may apply if different synthesis tools or manufacturers are chosen. Assuming the capability of a LBP layer is as strong as a convolutional layer in terms of classification accuracies. Replacing all MAC operations with comparison directly gives a 27× saving of hardware cost.

TABLE 2

Number of logic gates for arithmetic units.
Energy use data for 45 nm technology.

| Device Name | # of bits | # of gates | Energy (J) |
|---|---|---|---|
| Adder | 4 | 20 | ≤3E−14 |
|  | 32 | 160 | 9E−13 |
| Multiplier | 32 | ≥144 | 3.7E−12 |
| Comparator | 4 | 11 | ≤3E−14 |

Another important benefit is energy saving. If all MAC operations are replaced with comparisons, the energy consumption is reduced by 153×.

2.2 Backward Propagation in LBPNets

Backward propagation is the training process through which a neural network is able to adjust its filter values or weights. In some embodiments, the training of LBPNets may be performed with gradient-based optimization methods, and is based on tackling two problems: (i) the non-differentiability of the comparison operator, and (ii) the lack of a source force to push sampling points in a pattern.

Differentiability.

In some embodiments, the differentiability of the comparison operator is addressed by using the scaled hyperbolic tangent operation as shown in the following equations:

$$I_p > I_c$$

$$\frac{1}{2}\left(\tanh\left(\frac{I_p - I_c}{k}\right) + 1\right),$$

where k is the scaling parameters to accommodate the number of sampling points from a preceding LBP layer. The hyperbolic tangent function is differentiable and has a simple closed-form for the implementation, as depicted in FIG. 6. In the left sub-figure of FIG. 6, the red line denotes the comparison function, and the blue curve is the differentiable approximation. The right sub-figure of FIG. 6 shows the derivative of the approximation for convex optimization (with the scaling parameter set to 10).

Deformation with Optical Flow Theory.

To deform the local binary patterns, a concept from optical flow theory is adopted. Assuming the image content in the same class share the same features, even though there are certain minor shape transformations, chrominance variations or different view angles, the optical flow on these images should share similarities with each other.

$$\frac{\partial I}{\partial x}V_x + \frac{\partial I}{\partial y}V_y = -\frac{\partial I}{\partial t}$$

The above equation is an example of optical flow, where I is the pixel strength (e.g., luminance), $V_x$ and $V_y$ represent the two components of the optical flow among the same or similar image content. The LHS of optical flow theory can be interpreted as a dot-product of the image gradient and the optical flow, and this product is the inverse of the derivative of luminance versus time across different images.

To minimize the difference between images in the same class is equivalent to extract similar features of image in the same class for classification. However, both the direction and magnitude of the optical flow underlying the dataset are unknown. The minimization of a dot-product cannot be done by changing the image gradient to be orthogonal with the optical flow. Therefore, a feasible path to minimize the magnitude of the RHS is to minimize the image gradient. Note that the sampled image gradient $$\frac{\partial I}{\partial x}\hat{x} + \frac{\partial I}{\partial y}\hat{y}$$

can be changed by deforming the apertures, which are the sampling points of local binary patterns.

When applying the calculus chain rule on the cost of LBPNet with regard to the position of each sampling point, it is noticed that the last term of the chain rule is the image gradient. Since the sampled pixel strength is the same as the pixel strength on the image, the gradient of sampled strength with regard to the sampling location on a pattern is equivalent to the image gradient on the incoming image. The equation below shows the gradient from the output loss through a fully-connected layer with weights, $w_j$, toward the image gradient.

$$\frac{\partial \text{loss}}{\partial \text{position}} = \sum_j (\Delta_j w_j) \frac{\partial g(s)}{\partial s} \frac{\partial s}{\partial l_{i,p}} \left( \frac{dl_{i,p}}{dx}\hat{x} + \frac{dl_{i,p}}{dy}\hat{y} \right)$$

where $\Delta_j$ is the backward propagated error, $$\frac{\partial g(s)}{\partial s}$$

is the derivative or the activation function, and $$\frac{\partial s}{\partial l_{i,p}}$$

is the gradient of die approximation function of the comparison operator, which is also plotted in FIG. 6.

FIGS. 7A-7D illustrate an example of optical flow. As shown therein, the highest peak is moving toward the right-bottom, and the image gradients are different. The calculation of optical flow requires heavy linear algebraic manipulation, and the result is shown in sub-figure FIG. 7D. The optical flow reveals the motion of the highest peak and is often used for object tracking. Utilizing the above equation to train LBPNet is to calculate the vector sums over the image gradients. After the update, the sampling points (apertures) will move downhill or uphill depending on the error Δ. Without computing the optical flow, the sampling points are still pushed to a position with minimal average image gradient and a minimum absolute value of the RHS is guaranteed.

3. Example Experimental Results for LBPNets

A series of experiments is conducted on three datasets: MNIST, CIFAR-10, and SVHN to verify the efficacy and capability of LBPNet.

Experimental Setup.

Images in MNIST dataset are hand-written numbers from 0 to 9 in 32-by-32 gray scale bitmap format. The dataset is composed with a training set of 60,000 examples and a test set of 10,000 examples. The manuscript were written by both staff and students. Although most of the image can be easily recognized and classified, there are still a portion of sloppy images inside MNIST.

CIFAR-10 is composed of daily objects, such as airplanes, cats, dogs, trucks. The size of images is in 32-by-32 and has 3 channels of RGB colors. The training set includes 50,000 examples, and the test set includes 10,000 examples as well.

SVHN is an image dataset of house numbers. Although cropped, images in SVHN include some distracting numbers around the labeled number in the middle of the image. The distracting parts increase the difficulty of classifying the printed numbers. There are 73,257 training examples and 26,032 test examples in SVHN.

Figure 8:
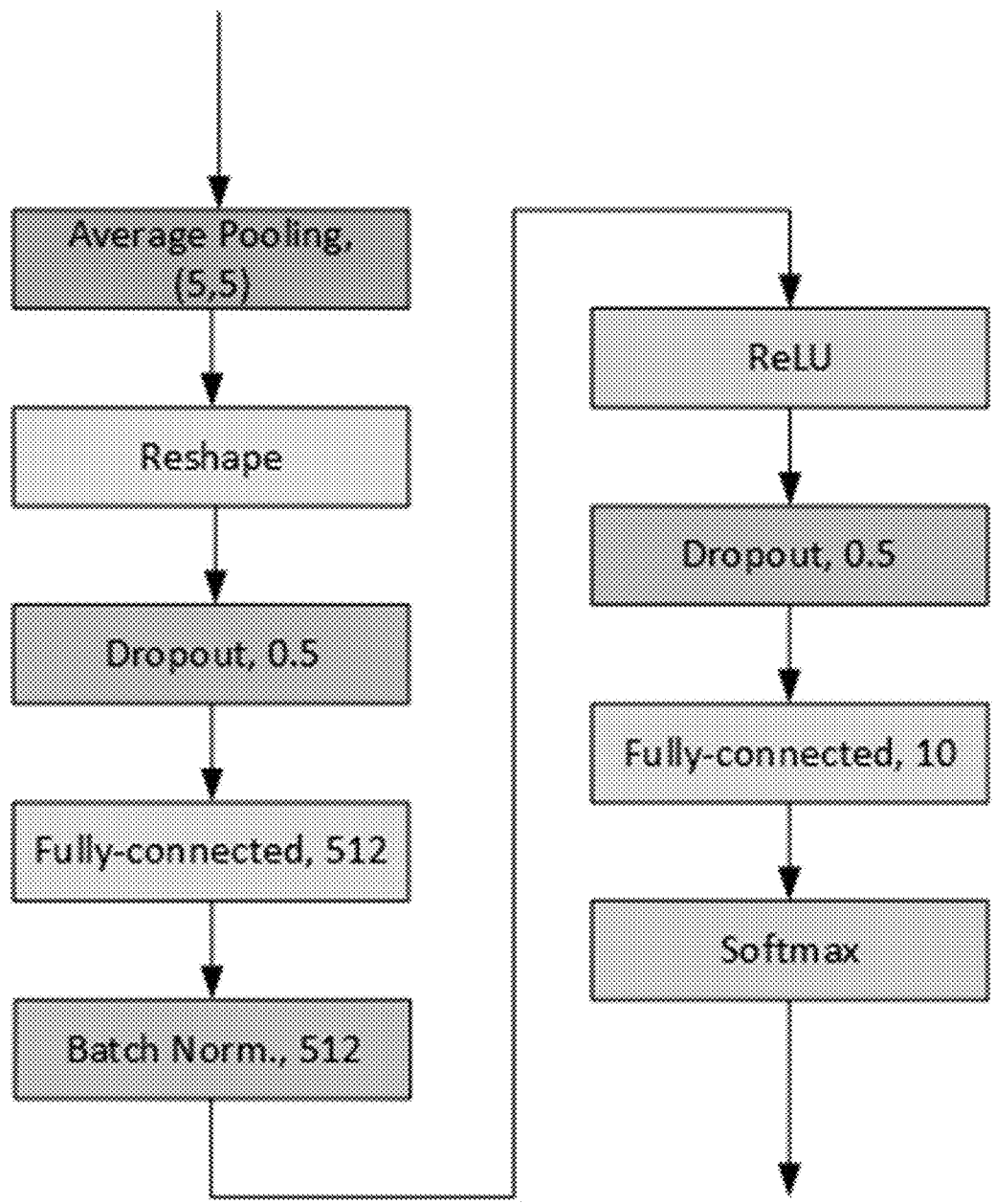
FIG. 8 shows a block diagram of an exemplary classifier used to quantify the efficacy of the performance of an LBPNet.

In all of the experiments, all training examples are used to train LBPNets, and directly validate on test sets. To avoid peeping, the validation errors are not employed in the backward propagation. There are no data augmentations used in the experiments. Because CIFAR-10 is relatively harder than the other two datasets, RGB channels are converted into YUV channels to improve the classification accuracy. The goal of the experiments is to compare LBPNet with convolution-based methods. Therefore, the classifier is fixed to be a 2-layer fully-connected MLP as shown in FIG. 8. The classifier's performance without any convolutional layers or LBP layers on the three datasets is shown in Table 3.

TABLE 3

The performance of the fixed classifier on three datasets

| Dataset | Error |
|---|---|
| MNIST | 24.22% |
| CIFAR-10 | 65.91% |
| SVHN | 77.78% |

Two versions of LBP Nets are implemented using the building blocks shown in FIGS. 5B and 5C, respectively. The LBPNet using 1-by-1 convolution as the channel fusion mechanism is referred to LBPNet (1×1). The other version of LBPNet utilizing random projection is totally convolution-free, and is referred to as LBPN(RDP). The number of sampling points in a pattern is set to 4, and the limiting area size for the pattern to deform is 5-by-5.

Experimental Results.

Two feed-forward streamlined CNNs are used as a baseline to assess the capability and efficacy of LBPNet. The basic block of the CNNs contains a spatial convolution layer (Cony) followed by a batch normalization layer (BatchNorm) and a rectified linear layer (ReLU). For MNIST, the baseline is a 4-layer CNN with kernel number of 40-80-160-320 before the classifier; the baseline CNN for CIFAR-10 and SVHN has 10 layers (64-64-128-128-256-256-256-512-512-512) before the classifier because the datasets are larger and include more complicated content.

The learning curves of LBPNets on the three datasets are plotted in FIGS. 9A-9C, respectively, and the error rates together with model sizes and speedups are described as follows. Table 4 shows the experimental results of LBPNet on MNIST together with the baseline and performance of previous systems. The classification error rates, model sizes, latency of the inferences, and the speedup compared with the baseline CNN are listed therein. The calculation of latency in cycles is made with an assumption that no SIMD parallelism and pipelining optimization is applied. FLOPs are not used as a metric since the total number of computations in every network need to be identified but both floating-point and binary arithmetic are involved. The typical cycle counts adopted as shown in Table 5.

TABLE 4

The performance of LBPNet on MNIST

| | Error | Size (Bytes) | Latency (cycles) | Speedup |
|---|---|---|---|---|
| CNN (3-layer) | 0.44% | 1.41M | 222.0M | 1X |
| BCNN-6L | 0.47% | 1.89M | 306.0M | 0.725X |
| LBCNN-75L | 0.49% | 12.18M | 8.776G | 0.0253X |
| LBPNet (this work) | | | | |
| LBPNet (1 × 1) | 0.51% | 1.27M | 27.73M | 8.004X |
| LBPNet (RDP) | 0.50% | 397.5 | 651.2K | 340.8X |

TABLE 5

Cycle count of different arithmetic operations involved in the experiments

| Arithmetic operation | # of cycles |
|---|---|
| 32 × 32 bit Multiplication | 4 |
| 32 × 1 bit Multiplication | 1 |
| 1 × 1 bit Multiplication | 1 |
| 32 bit Addition | 1 |
| 4 bit Comparison | 1 |

The baseline CNN (3-L) achieves the lowest classification error rate 0.44%. The BCNN possesses a decent memory reduction and speedup while maintaining the classification. While LBCNN claimed its saving in memory footprint, to achieve 0.49% error rate, 75 layers of LBCNN basic blocks are used. As a result, LBCNN loses memory gain and the speedup. The 10-layer LBPNet (1×1) with 16 LBP kernels and 128 1-by-1 convolutional kernels achieves 0.51%. The 3-layer LBPNet (RDP) with structure of 39-40-80 achieves 0.50% error rate. Although LBPNet's performance is slightly inferior than previous works, the model size of LBPNet (RDP) is reduced to 397.5 KB and the speedup is 340.8× faster than the baseline CNN. Even BNN cannot reach such a huge memory reduction and speedup. The learning of LBPNet's sampling point positions is proven to be effective and economical.

Table 6 shows the experimental results of LBPNet on CIFAR-10 together with the baseline and previous works. The 10-layer baseline CNN achieves 8.39% error rate with model size 31.19 MB. BCNN achieved a slightly higher error rate but maintained a decent memory reduction. Due to the relatively large number of binary kernels, the batch normalization layer in BCNN's basic blocks still needs to perform floating-point multiplications hand hence drags down the speed up. LBCNN uses 50 basic blocks to achieve the stat-of-the-art accuracy 7.01% error rate. Once again, the large model of the 50-layer LBCNN with 704 binary kernels and 384 1-by-1 floating number kernels has no memory gain and speedup compared with the baseline. The 10-layer LBPNet (1×1) using 512 LBP kernels and 128 1-by-1 kernels achieves 25.5% error rate, and the 5-layer LBPN (RDP) with 150 LBP kernels on each layer achieves 41.36%. The main reason that stops LBPNets from getting a lower error rate is due to the discontinuity of comparison. Unlike MNIST having distinct strokes and outlines, CIFAR-10 is composed with daily objects, which often have gradient transitions and obscure boundaries. LBPNets experience a hard time while extracting edges among the images in CIFAR-10, and hence the classification results are not as good as other works. LBCNN can overcome the lack of edges because it is not a genuine bit-wise operation. LBCNN binarized and sparsified the convolutional kernels to make LBP-like, but it still took advantage of floating point arithmetic and feature maps and cuDNN library. This is the reason why LBCNN can learn the gradient transitions in CIFAR-10 very well.

Another possible reason for this inferior error rate is that although the inference of LBPNet is designed to be small and efficient, the backward propagation is not fully supported by CUDA BLAS and cuDNN libraries. The core of LBCNN is still convolution, and its forward and backward are fully supported by cuDNN library, which is highly optimized CUDA library. A large portion of LBPNet's backward propagation cannot be equivalent to general matrix multiplication (GEMM) manipulation, nor accelerated by cuDNN. If the GPU programming issue is overcome and the efficiency of backward propagation is improved, the huge memory reduction and speedup allow us to stack a deeper LBPNet to approach the state-of-the-art performance on CIFAR-10.

TABLE 6

The performance of LBPNet on CIFAR-10

| | Error | Size (Bytes) | Latency (cycles) | Speedup |
|---|---|---|---|---|
| CNN (10-layer) | 8.39% | 31.19M | 1.426G | 1X |
| BCNN | 10.15% | 7.19M | 4.872G | 0.29X |
| LBCNN | 7.01% | 211.93M | 193.894G | 0.01X |
| LBPNet (this work) | | | | |
| LBPNet (1 × 1) | 24.83% | 13.53M | 4.051G | 0.35X |
| LBPNet (RDP) | 29.66% | 1.88K | 3.072M | 464.97X |

Table 7 shows the experimental results of LBPNet on SVHN together with the baseline and previous works.

BCNN outperforms our baseline and achieves 2.53% with smaller memory footprint and higher speed. The LBCNN for SVHN dataset used 40 layers, and each layer contains only 16 binary kernels and 512 1-by-1 kernels. As a result, LBCNN roughly cut the model size and the latency into a half of the LBCNN designed for MNIST. The 5-layer LBPNet (1×1) with 32 LBP kernels and 256 1-by-1 convolutional kernels achieve 8.33%, which is close to our baseline CNN's 8.30%. The LBPNet (RDP) in a structure of 67-70-140-280-560 for SVHN is built with 5 layers of LBP basic blocks as shown in FIG. 5.

TABLE 7

The performance of LBPNet on SVHN

|  | Error | Size (Bytes) | Latency (cycles) | Speedup |
| --- | --- | --- | --- | --- |
| CNN (5-layer) | 8.30% | 15.96M | 9.714G | 1X |
| BCNN-6L | 2.53% | 1.89M | 312M | 31.18X |
| LBCNN-40L | 5.50% | 6.70M | 7.098G | 1.369X |
| LBPNet (this work) | | | | |
| LBPNet (1 × 1) | 8.33% | 1.51M | 9.175M | 1059X |
| LBPNet (RDP) | 7.31% | 2.79K | 4.575M | 2123X |

Figure 10:
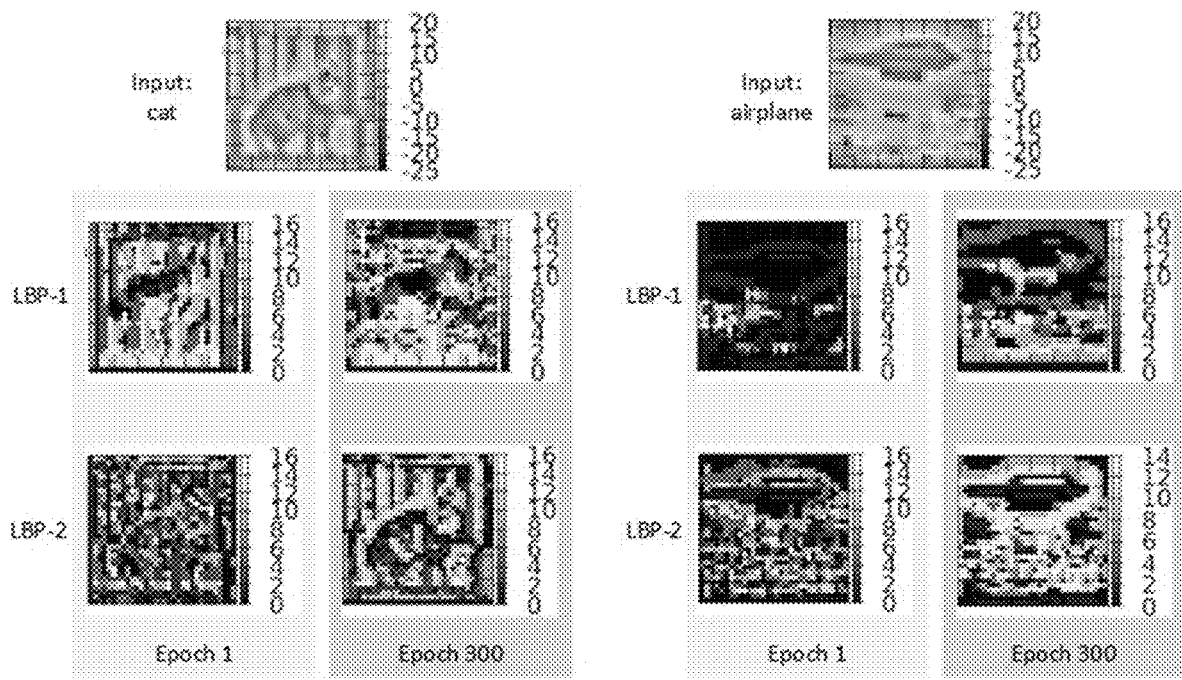
FIG. 10 shows examples of the learning transition on feature maps for an LBPNet.

The learning curves of LBPNets are plotted in FIGS. 9A-9C, and the baseline CNN's error rates are plotted in blue as a reference. Throughout the three datasets, the LBPNet (1×1)'s learning curves oscillate most because a slight shift of the local binary pattern will require the following 1-by-1 convolutional layer to change a lot to accommodate the intermediate feature maps. This is not problematic as the trend of learning still functions correctly towards a lower error rate state. FIG. 10 shows two examples of the learning transition of feature maps on CIFAR-10. The left hand side of FIG. 10 is to learn a cat in the top-left. The right hand side of FIG. 10 is to learn an airplane flying in the sky. As seen in the transition from Epoch 1 to Epoch 300, the features become more clear and recognizable. The cat's head and back are enhanced, and the outline of the airplane is promoted after the learning of local binary patterns.

Furthermore, two ablation experiments to for LBCNN and LBPNets (RDP) on CIFAR-10 were conducted. Starting from the 10-layer baseline CNNs for CIFAR-10, convolutional layers were replaced with LBP layers and LBCNN layers. The target convolutional layer for ablation are #1, #3, #5 and #8. The results of ablation on CIFAR-10 are listed in Table 8 and FIG. 11.

TABLE 8

The ablation experiments of LBPNet on CIFAR-10

|  |  | Error | Size (Bytes) | Latency (cycles) |
| --- | --- | --- | --- | --- |
| CNN (10-layer) |  | 8.39% | 31.19M | 1.426G |
| 1L | LBCNN | 18.82% | 30.55M | 1.239G |
|  | LBPNet | 11.62% | 30.68M | 1.417G |
| 2L | LBCNN | 18.76% | 30.27M | 1.080G |
|  | LBPNet | 13.79% | 30.15M | 1.058G |
| 3L | LBCNN | 19.17% | 29.04M | 0.920G |
|  | LBPNet | 17.13% | 28.90M | 0.982G |
| 4L | LBCNN | 21.08% | 22.55M | 0.761G |
|  | LBPNet | 27.92% | 24.34M | 0.907G |

Figure 11:
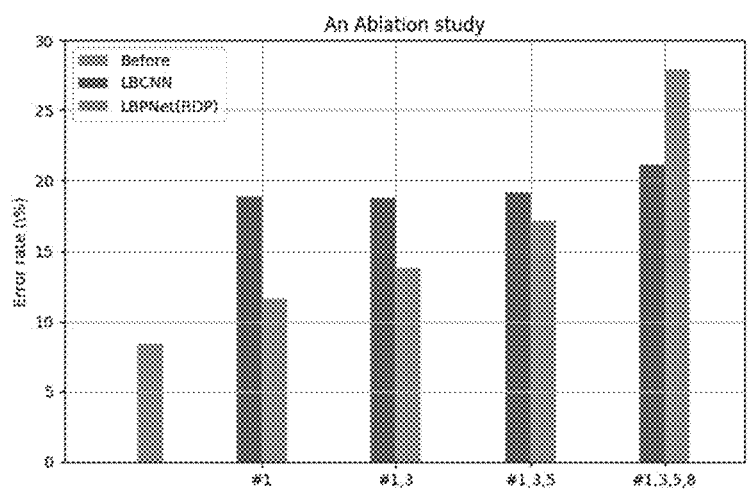
FIG. 11 shows the result of an ablation experiment for the LBPNet.

As shown in the Table 8 and FIG. 11, during the ablating, both experiments' error rates are rising. In the beginning of ablation, LBPNet outperforms LBCNN. When the ablation going through more and more max pooling layers, LBCNN starts to surpass LBPNet when the image size is as small as 4-by-4. FIG. 11 also indicates that LBP layer is more sensitive to the spatial size of input feature maps. A logical explanation is the limiting area of LBPNet's pattern is 5-by-5. Although a 4-by-4 incoming feature map is padded with two rings of zeros, the sampled pixels are too sparse to extract helpful features.

Embodiments of the disclosed technology comprise convolution-free, end-to-end, and bit-wise LBPNet for deep learning, which have been verified on MNIST, CIFAR-10, and SVHN. LBP-Nets achieve near the state-of-the-art error rates of 0.50% and 7.31% on MNIST and SVHN, respectively. Both the memory footprints and computation latencies of LBPNet and previous works are listed in this paper. Due to the MAC-free design, the saving of memory size is greater than 3,500×, and the speedup is higher than 340× compared with the baseline CNNs.

4. Exemplary Methods and Implementations of the Disclosed Technology

FIG. 12 shows an example of the forward propagation algorithm of an LBP layer, As shown therein, the three outermost nested loops form the sliding window operation to generate an output feature map, and the innermost loop is the LBP operation. In this example, the LBP operation is combined with random projection to avoid unnecessary comparisons. This is implemented by looking up the random projection map for the input plane index and then using it to sample only the necessary pairs for the comparison.

The core of LBPNet is implemented with bit shifting and bitwise-OR, and both of them have no concurrent accessing issue. In some embodiments, this may be directly implemented with CUDA programming to accelerate the inference on a GPU.

FIG. 13 shows an example of a high-level backward propagation algorithm for the LBPNet. The operations and functions shown in FIG. 13 include:

The ImageGradient(•) function calculates the image gradient vector field of the input feature map.

The round(•) function then discretizes the previous real-valued pattern for the subsequent image sampling operation.

The LookUpDifference(•) function samples the input tensor with the concerned input plane index from the projection map. This step is similar to the core of Algorithm 1 shown in FIG. 12, but the difference is calculated instead of comparing the pairs of sampled pixels.

The ConstructExp(•) function multiplies the hyperbolic tangential difference matrix with the exponential of 2 corresponding to the position of the comparison result in an output bit array. For example, if a comparison result is allocated to the MSB, the hyperbolic tangential value will be multiplied with $2^{n_s}$, assuming $n_s$ sampling pairs per kernel.

The ConstructDiffExp(•) function performs the same calculation with ConstructExp(•) except for the first argument is replaced with the derivative of tan h(•). These two sub-routine functions convert sparse kernels to dense kernels for the subsequent matrix-to-matrix multiplications.

The sixth line in FIG. 13 uses a matrix-to-matrix multiplication to collect and weight the output gradient tensor from the successive layer. This step is the same with CNN's backward propagation. The resulting tensor is also called input gradient tensor and will be passed to the preceding layer to accomplish the backward propagation.

The seventh line in FIG. 13 element-wisely times the differential exponential matrix with the image gradient first and then multiply the result with the output gradient tensor. The resulting tensor carries the gradient of LBP parameters, ∂cost/∂position, which will be multiplied with an adaptive learning rate for the update of sampling positions of an LBP kernel.

Figure 14:
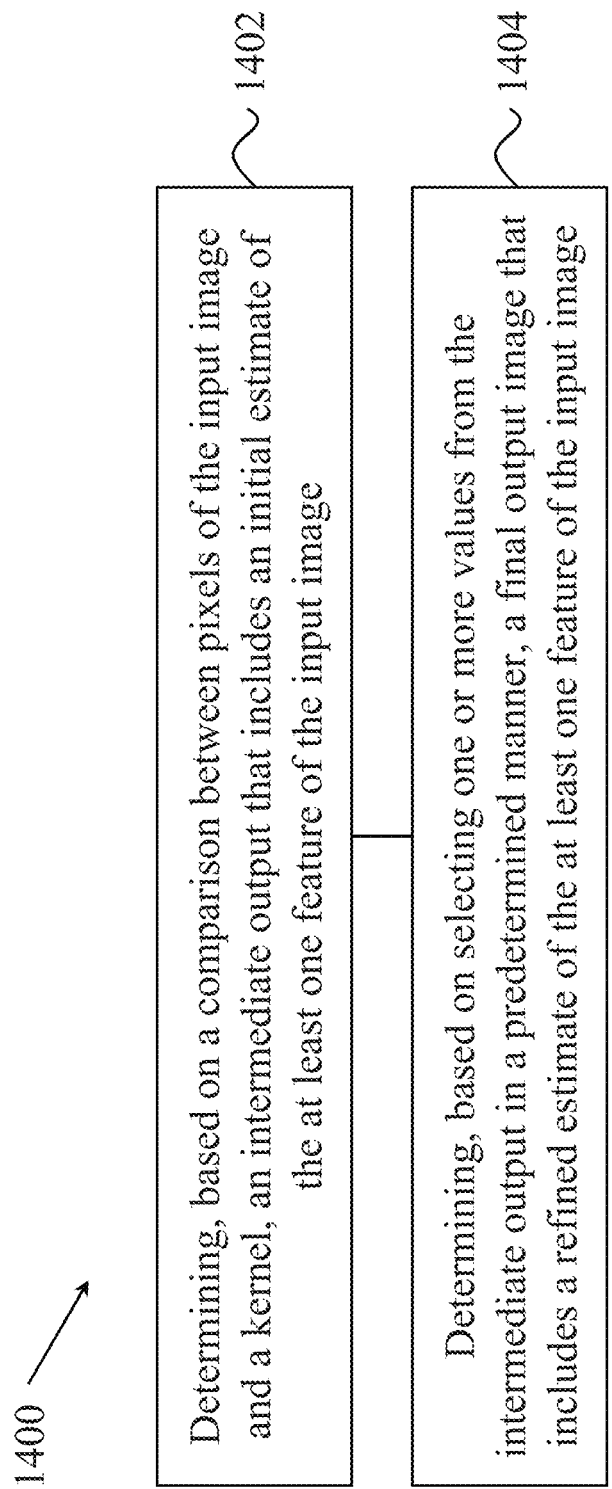
FIG. 14 shows a flowchart of an example method for training an efficient implementation of a pattern classifier.

FIG. 14 shows a flowchart of an exemplary method for pattern recognition and classification. The method 1400 includes, at step 1402, determining, based on a comparison between pixels of the input image and a kernel, an intermediate output that includes an initial estimate of the at least one feature of the input image.

The method 1400 includes, at step 1404, determining, based on selecting one or more values from the intermediate output in a predetermined manner, a final output image that includes a refined estimate of the at least one feature of the input image.

In some embodiments, the comparison includes comparing a value of a pixel of the input image that aligns with a center sample of the kernel to one or more values of one or more pixels of the input image that align with predetermined samples of the kernel that are adjacent to the center sample.

In some embodiments, the method 1400 includes the step of zero-padding the input image such that dimensions of the final output image are equal to dimensions of the input image.

In some embodiments, the predetermined samples are randomly selected from the samples adjacent to the center sample.

In some embodiments, the intermediate output comprises a bit vector that includes one or more results of the comparison, and wherein a bit value for an element of the bit vector is set to 1 when the value of the pixel of the input image that aligns with the corresponding predetermined sample of the kernel is greater than the value of the corresponding pixel of the input image that aligns with the center sample.

In some embodiments, the input image comprises a plurality of channels ($N_{in}$), wherein the kernel is one of a plurality of kernels ($N_k$), and wherein the intermediate output is one of a plurality of intermediate outputs ($N_{in} \times N_k$). In an example, each of the plurality of intermediate outputs is determined for each of the plurality of channels of the input image using a corresponding one of the plurality of kernels, and each of the plurality of kernels comprises a distinct configuration for the predetermined samples. In another example, the final output image comprises a plurality of output channels ($N_{out}=N_k$), and wherein a number of the plurality of intermediate channels ($N_{in} \times N_k$) is reduced to a number of the plurality of output channels based on a random projection technique. In yet another example, the random projection technique may include the one described in step 1404. In yet another example, a different random projection technique may be used to reduce the number of output channels.

In some embodiments, and in the context of method 1400, the steps disclosed may result in outputs that are generated. In other embodiments, the steps may be performed so as to determine the output value of image, which is immediately used in a subsequent computation or calculation. In yet other embodiments, the steps described may result in both a determination and/or a generation.

In some embodiments, the disclosed technology includes another method for extracting a feature. This methods comprises comparing a binary pattern to one or more portions of an input image to generate a plurality of binary results, and generating an estimate of the feature based on the plurality of binary results. In an example, the binary pattern comprises a center sample and a set of predetermined samples adjacent to the center sample, and comparing the binary pattern to a portion of the input image comprises the step of comparing a value of a pixel of the input image that aligns with the center sample to one or more values of one or more pixels of the input image that align with predetermined samples. In another example, one or more of the set of predetermined samples are directly adjacent to the center sample. In yet another example, a first subset of the set of predetermined samples are directly adjacent to the center sample, and a second subset of the set of predetermined samples are not directly adjacent to the center sample. In yet another example, the estimate of the feature is one of a plurality of estimates of the feature, wherein the input image comprises a plurality of channels, and wherein each of the plurality of estimates is generated for each of the plurality of channels. In yet another example, the method further includes the step of generating a refined estimate of the feature based on randomly selecting a portion of one or more of the plurality of estimates of the feature.

In some embodiments, the disclosed technology includes another method for extracting a feature. This method includes generating a final image, comprising a final estimate of the feature, by randomly selecting one or more portions from each of a plurality of initial images, wherein each of the plurality of initial images comprises an initial estimate of the feature. In an example, the plurality of initial images correspond to different channels of an input image, and randomly selecting one or more portions includes the steps of selecting one or more bits from a bit representation of a value of a pixel of each of the plurality of initial images, and concatenating the selected one or more bits to generate a value of a corresponding pixel of the final image. In another example, the different channels comprise red, blue and green color channels. In yet another example, the method includes the step of generating each of the plurality of initial images based on comparing one or more portions of an input image to a binary pattern.

In some embodiments, the disclosed technology includes yet another method for training a feature classifier. This method includes evolving a local binary pattern using a gradient-based optimization method, wherein the gradient based optimization method is based on optical flow theory and a differentiable approximation of a comparison operation. In an example, the differentiable approximation of the comparison operation comprises a scaled and shifted hyperbolic tangent function.

In some embodiments, the disclosed technology includes yet another method for extracting at least one feature of an input image. This method includes the steps of determining a bit vector of an intermediate output by applying a local binary pattern (LBP) kernel to a corresponding pixel of an input image, and determining a pixel of a final output, which comprises an estimate of the at least one feature of the input image, by applying a projection to a corresponding bit vector of the intermediate output, wherein the LBP kernel comprises a center sample and predetermined sampling points in samples adjacent to the center sample. In an example, applying the LBP kernel to the corresponding pixel includes aligning the center sample of the LBP kernel and the corresponding pixel on the input image, comparing a value of the corresponding pixel that aligns with the center sample to a value of a pixel, in the input image, that aligns with each of the predetermined sampling points of the LBP kernel, and determining bit values for elements of the bit vector of the intermediate output based on the comparisons. In another example, applying the random projection to the corresponding bit vector includes selecting a predetermined one or more elements of the corresponding bit vector, and concatenating the bit values in the selected one or more elements to determine an output value for the corresponding pixel of the final output. In yet another example, the method includes the step of zero-padding the input image such that dimensions of the two-dimensional output are equal to dimensions of the input image. In yet another example, the predetermined sampling points of the LBP kernel are randomly selected from the samples adjacent to the center sample. In yet another example, a bit value for an element of the bit vector is set to 1 when the value of the pixel that aligns with the corresponding predetermined sampling point of the LBP kernel is greater than the value of the corresponding pixel that aligns with the center sample. In yet another example, the input image comprises a plurality of channels, wherein the intermediate output is one of a plurality of intermediate outputs, and the LBP kernel is one of a plurality of LBP kernels. In yet another example, each of the plurality of intermediate outputs is determined for each of the plurality of channels of the input image using a corresponding one of the plurality of LBP kernels. In yet another example, each of the plurality of LBP kernels comprises a distinct configuration for the predetermined sampling points. In yet another example, the output value for the corresponding pixel of the final output is based on concatenating bit values in elements of bit vectors of each of the plurality of intermediate outputs.

Figure 15:
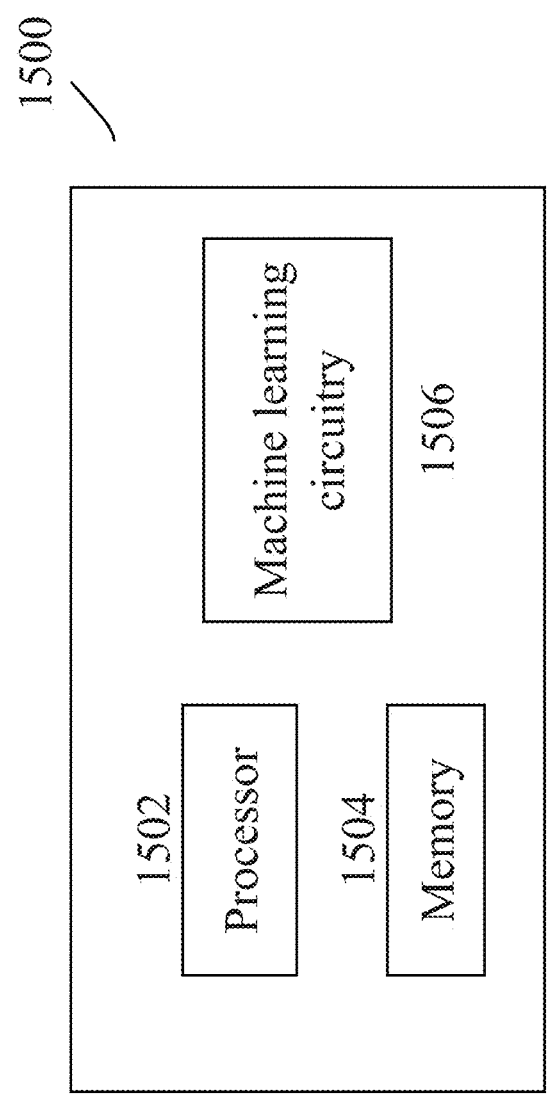
FIG. 15 is a block diagram of an example of a hardware platform for implementing the machine learning methods described in the present document.

FIG. 15 is a block diagram of an image and/or video processing apparatus 1500. The apparatus 1500 may be used to implement one or more of the methods described herein. The apparatus 1500 may be embodied in a smartphone, tablet, computer, Internet of Things (IoT) receiver, digital camera, and so on. The apparatus 1500 may include one or more processors 1502, one or more memories 1204 and image/video processing hardware 1506. The processor(s) 1502 may be configured to implement one or more methods (including, but not limited to, methods 1400) described in the present document. The memory (or memories) 1504 may be used for storing data and code used for implementing the methods and techniques described herein. The machine learning hardware 1506 may be used to implement, in hardware circuitry, some techniques, algorithms or methods described in the present document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method for extracting at least one feature of an input image, the method comprising:
    determining, based on a comparison between pixels of the input image and a kernel, an intermediate output that includes an initial estimate of the at least one feature of the input image; and
    determining, based on selecting one or more values from the intermediate output in a predetermined manner, a final output image that includes a refined estimate of the at least one feature of the input image,
    wherein the comparison comprises:
        comparing a value of a pixel of the input image that aligns with a center sample of the kernel to one or more values of one or more pixels of the input image that align with predetermined samples of the kernel that are adjacent to the center sample, and wherein the predetermined samples are randomly selected from the samples adjacent to the center sample.

2. The method of claim 1, further comprising:
    zero-padding the input image such that dimensions of the final output image are equal to dimensions of the input image.

3. The method of claim 1, wherein the intermediate output comprises a bit vector that includes one or more results of the comparison, and wherein a bit value for an element of the bit vector is set to 1 when the value of the pixel of the input image that aligns with the corresponding predetermined sample of the kernel is greater than the value of the corresponding pixel of the input image that aligns with the center sample.

4. The method of claim 1, the input image comprises a plurality of channels ($N_{in}$), wherein the kernel is one of a plurality of kernels ($N_k$), and wherein the intermediate output is one of a plurality of intermediate outputs ($N_{in} \times N_k$).

5. The method of claim 4, wherein each of the plurality of intermediate outputs is determined for each of the plurality of channels of the input image using a corresponding one of the plurality of kernels.

6. The method of claim 5, wherein each of the plurality of kernels comprises a distinct configuration for the predetermined samples.

7. The method of claim 4, wherein the final output image comprises a plurality of output channels ($N_{out}=N_k$), and wherein a number of the plurality of intermediate channels ($N_{in} \times N_k$) is reduced to a number of the plurality of output channels based on a random projection technique.

8. A device for extracting at least one feature of an input image, comprising:
    a processor; and
    a memory that comprises instructions stored thereupon, wherein the instructions when executed by the processor configure the processor to:
        determine, based on a comparison between pixels of the input image and a kernel, an intermediate output that includes an initial estimate of the at least one feature of the input image; and
        determine, based on selecting one or more values from the intermediate output in a predetermined manner, a final output image that includes a refined estimate of the at least one feature of the input image,
    wherein the instructions when executed by the processor further configure the processor, as part of the comparison, to:
        compare a value of a pixel of the input image that aligns with a center sample of the kernel to one or more values of one or more pixels of the input image that align with predetermined samples of the kernel that are adjacent to the center sample, wherein the predetermined samples are randomly selected from the samples adjacent to the center sample.

9. The device of claim 8, wherein the instructions when executed by the processor further configure the processor to:
    zero-pad the input image such that dimensions of the final output image are equal to dimensions of the input image.

10. The device of claim 8, wherein the intermediate output comprises a bit vector that includes one or more results of the comparison, and wherein a bit value for an element of the bit vector is set to 1 when the value of the pixel of the input image that aligns with the corresponding predetermined sample of the kernel is greater than the value of the corresponding pixel of the input image that aligns with the center sample.

11. The device of claim 8, the input image comprises a plurality of channels, wherein the intermediate output is one of a plurality of intermediate outputs, and wherein the kernel is one of a plurality of kernels.

12. The device of claim 11, wherein each of the plurality of intermediate outputs is determined for each of the plurality of channels of the input image using a corresponding one of the plurality of kernels.

13. A non-transitory computer readable program storage medium having code stored thereon, the code, when executed by a processor, causing the processor to implement a method for extracting at least one feature of an input image, the method comprising:
    determining, based on a comparison between pixels of the input image and a kernel, an intermediate output that includes an initial estimate of the at least one feature of the input image; and
    determining, based on selecting one or more values from the intermediate output in a predetermined manner, a final output image that includes a refined estimate of the at least one feature of the input image,
    wherein the comparison comprises:
        comparing a value of a pixel of the input image that aligns with a center sample of the kernel to one or more values of one or more pixels of the input image that align with predetermined samples of the kernel that are adjacent to the center sample, wherein the predetermined samples are randomly selected from the samples adjacent to the center sample.

14. The non-transitory computer readable program storage medium of claim 13, wherein the method further comprises:
zero-padding the input image such that dimensions of the final output image are equal to dimensions of the input image.

15. The non-transitory computer readable program storage medium of claim 13, wherein the intermediate output comprises a bit vector that includes one or more results of the comparison, and wherein a bit value for an element of the bit vector is set to 1 when the value of the pixel of the input image that aligns with the corresponding predetermined sample of the kernel is greater than the value of the corresponding pixel of the input image that aligns with the center sample.

16. The non-transitory computer readable program storage medium of claim 13, wherein the input image comprises a plurality of channels, and wherein the intermediate output is one of a plurality of intermediate outputs, and wherein the kernel is one of a plurality of kernels.

17. The non-transitory computer readable program storage medium of claim 16, wherein each of the plurality of intermediate outputs is determined for each of the plurality of channels of the input image using a corresponding one of the plurality of kernels.

18. The method of claim 1, wherein randomly selecting the predetermined samples is based on a normal distribution of locations on the kernel.

19. The device of claim 8, wherein randomly selecting the predetermined samples is based on a normal distribution of locations on the kernel.

20. The non-transitory computer readable program storage medium of claim 13, wherein randomly selecting the predetermined samples is based on a normal distribution of locations on the kernel.

* * * * *